No. 865,490. PATENTED SEPT. 10, 1907.
G. M. GRAHAM.
REINFORCED CONCRETE CONSTRUCTION.
APPLICATION FILED DEC. 27, 1906.

8 SHEETS—SHEET 1.

Attest:
John Enders
Harry Moe

Inventor.
George M. Graham
by Robert Burns
Attorney

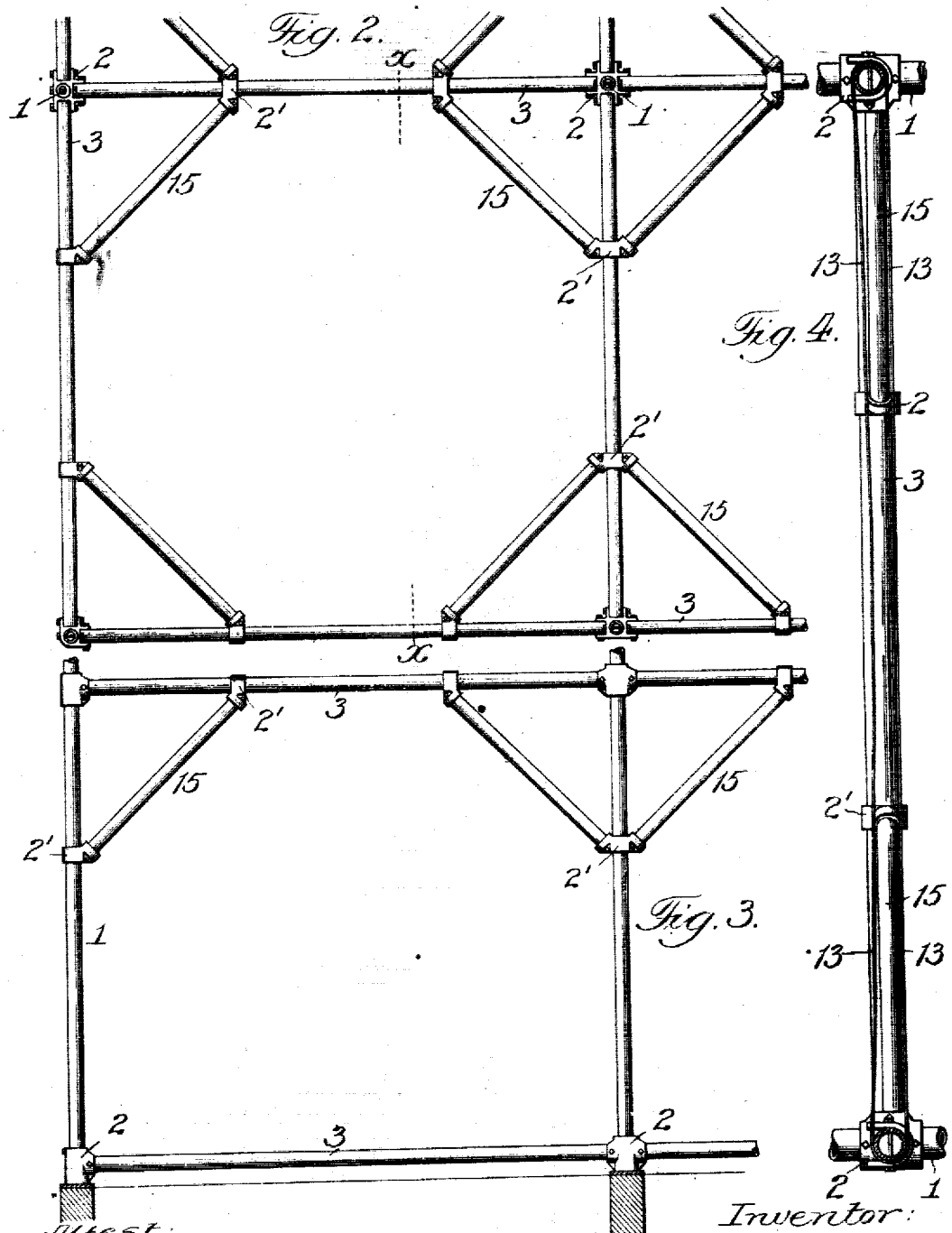

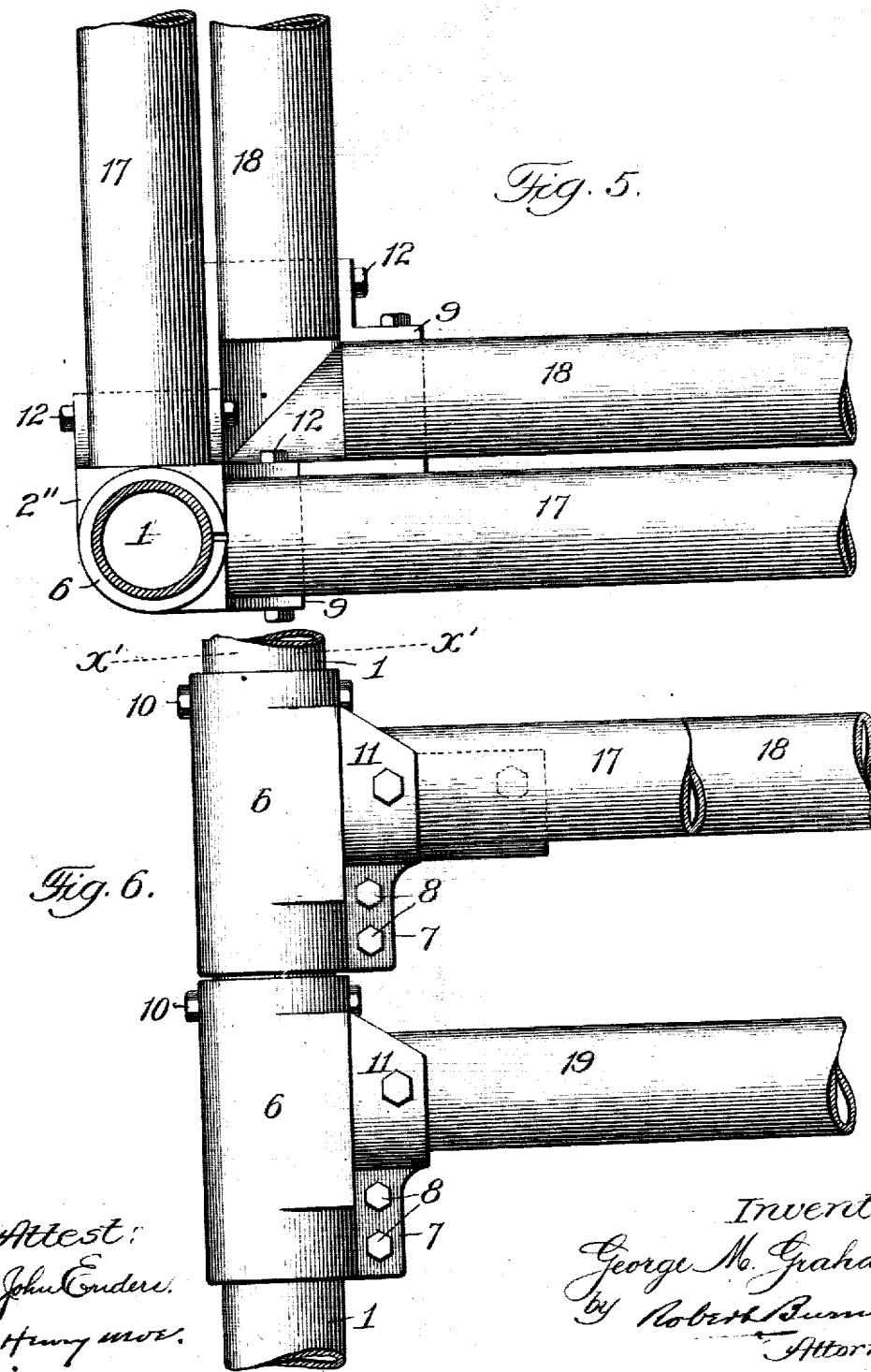

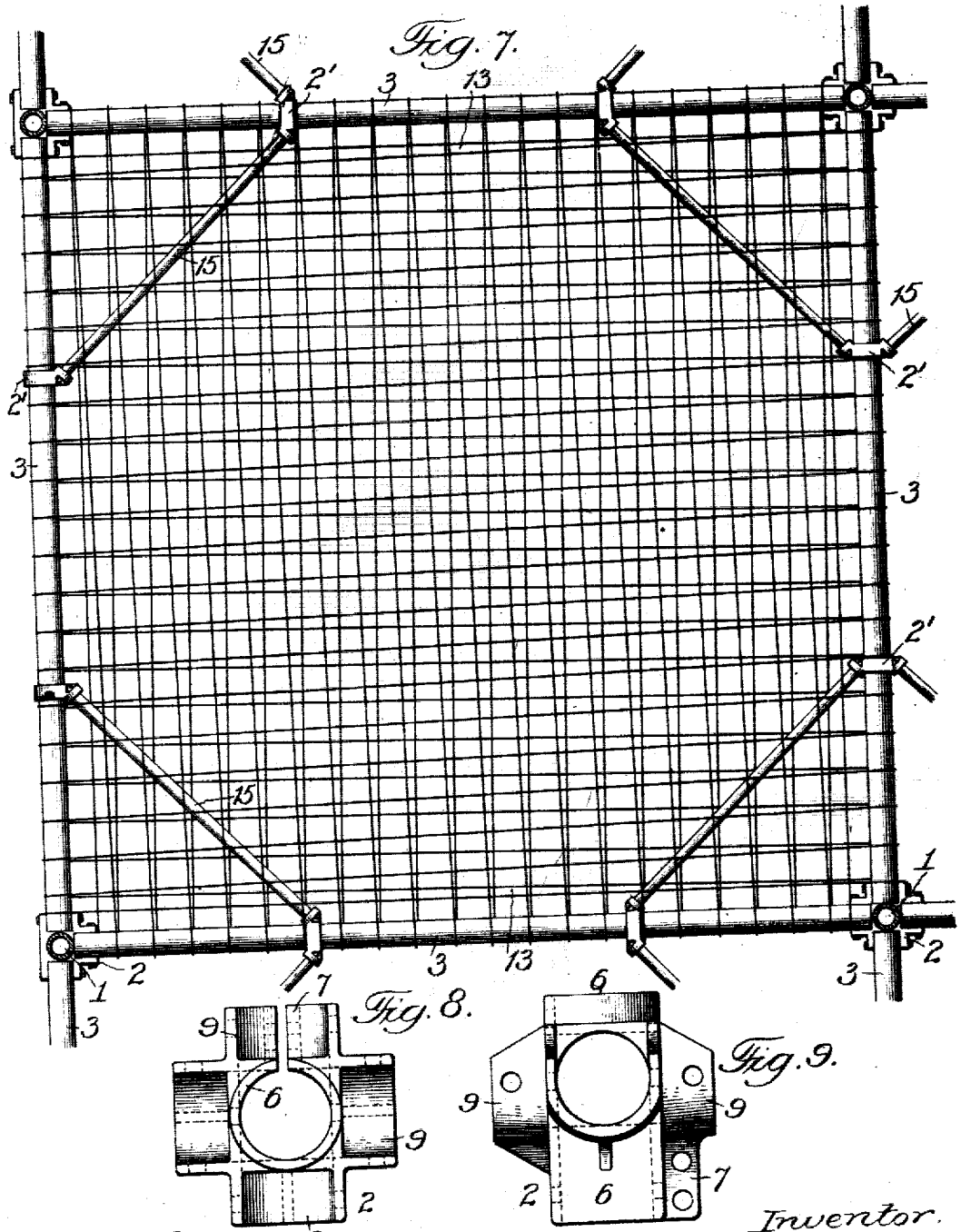

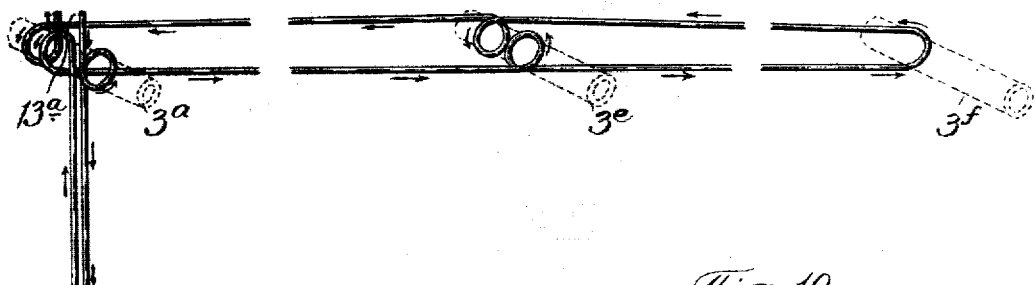
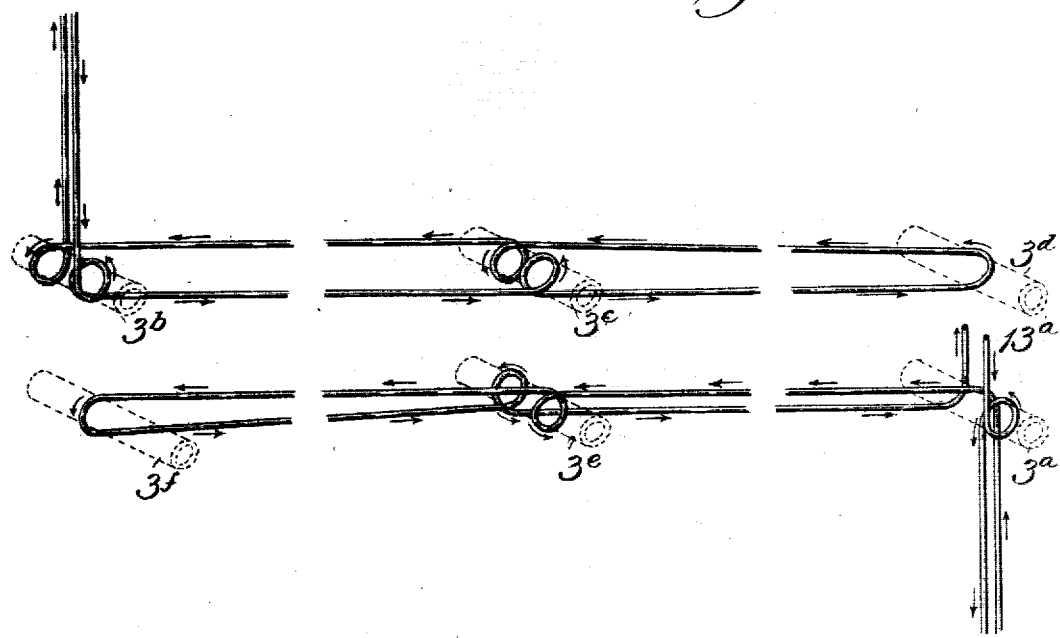
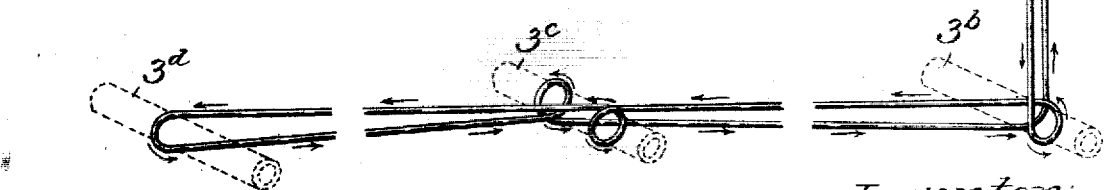

No. 865,490. PATENTED SEPT. 10, 1907.
G. M. GRAHAM.
REINFORCED CONCRETE CONSTRUCTION.
APPLICATION FILED DEC. 27, 1906.

8 SHEETS—SHEET 6.

Attest:
John Enders
Henry Moe

Inventor:
George M. Graham,
by Robert Burns
Attorney

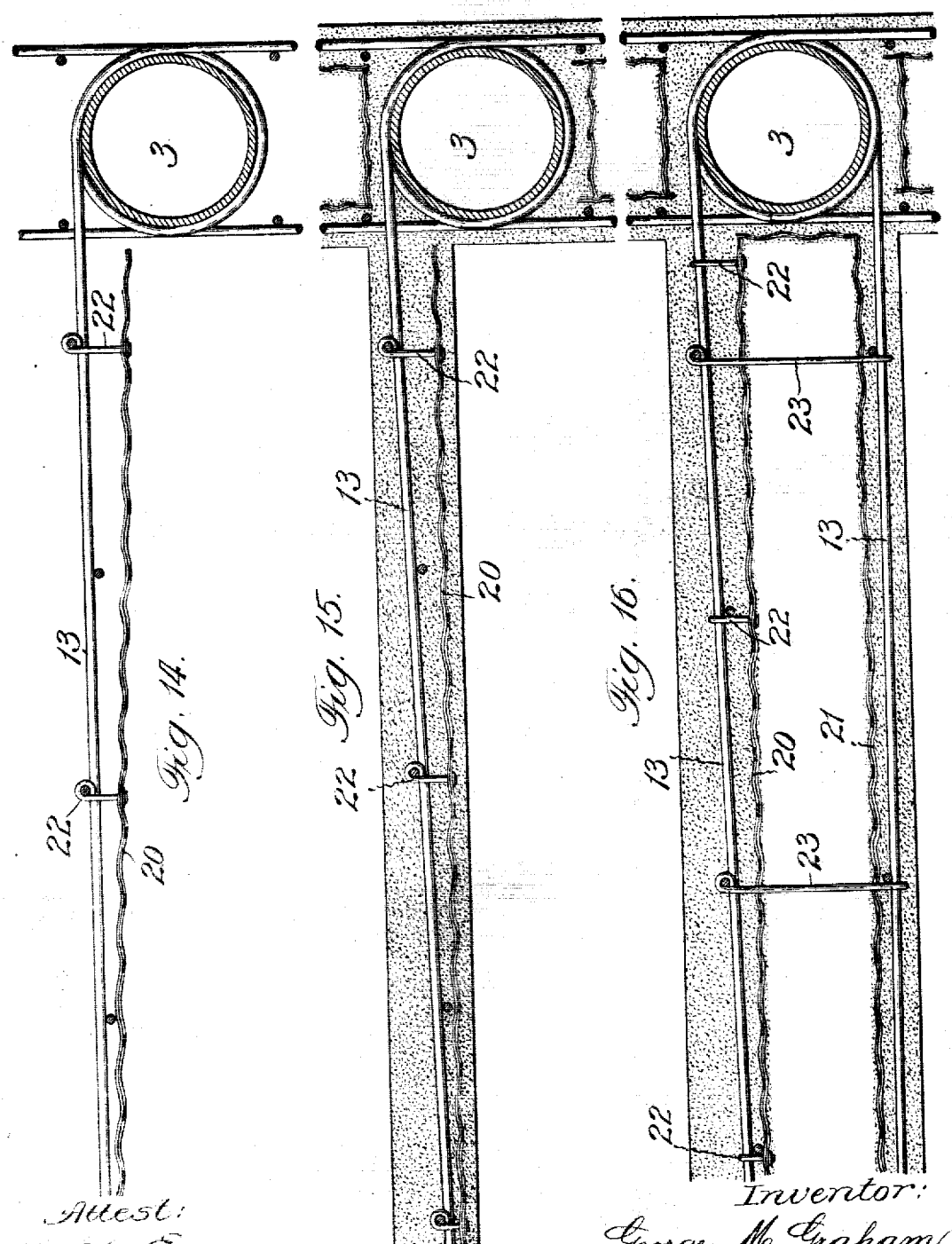

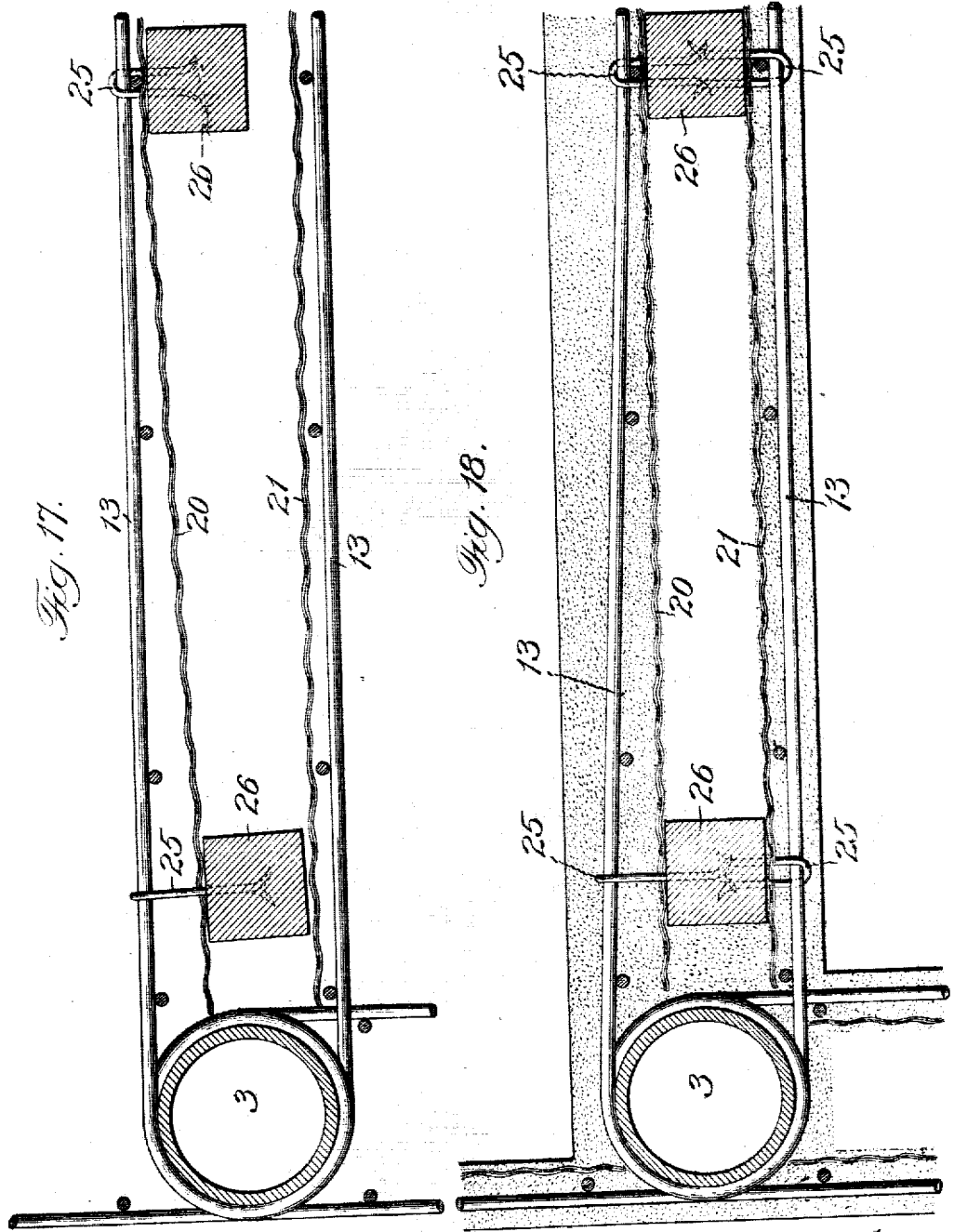

UNITED STATES PATENT OFFICE.

GEORGE M. GRAHAM, OF CHICAGO, ILLINOIS, ASSIGNOR, BY DIRECT AND MESNE ASSIGNMENTS, TO G. A. EDWARD KOHLER, OF CHICAGO, ILLINOIS.

REINFORCED CONCRETE CONSTRUCTION.

No. 865,490.    Specification of Letters Patent.    Patented Sept. 10, 1907.

Application filed December 27, 1906. Serial No. 349,684.

*To all whom it may concern:*

Be it known that I, GEORGE M. GRAHAM, a citizen of the United States of America, and a resident of Chicago, in the county of Cook and State of Illinois, have invented certain new and useful Improvements in Reinforced Concrete Construction, of which the following is a specification.

This invention relates to that type of building and other structures in which a tubular reinforce frame of metal is arranged within the body or mass of concrete to afford added strength thereto: and the present improvements has for its various objects:—to provide a simple and efficient structural arrangement and combination of parts adapted to afford a skeleton reinforce frame of a light, rigid and economical construction; to provide in connection with such skeleton frame a simple and efficient means for receiving the concrete to form a wall or like part of the completed structure; to provide in connection with such skeleton frame a cheap and efficient means for forming a reinforced concrete floor or like horizontal part of a completed structure, of great strength and either solid or hollow as desired, and generally to provide detail structural features and combinations of parts whereby a reinforced concrete structure of a strong and durable nature is attained in a ready and economical manner, all as will hereinafter more fully appear.

Figure 1:
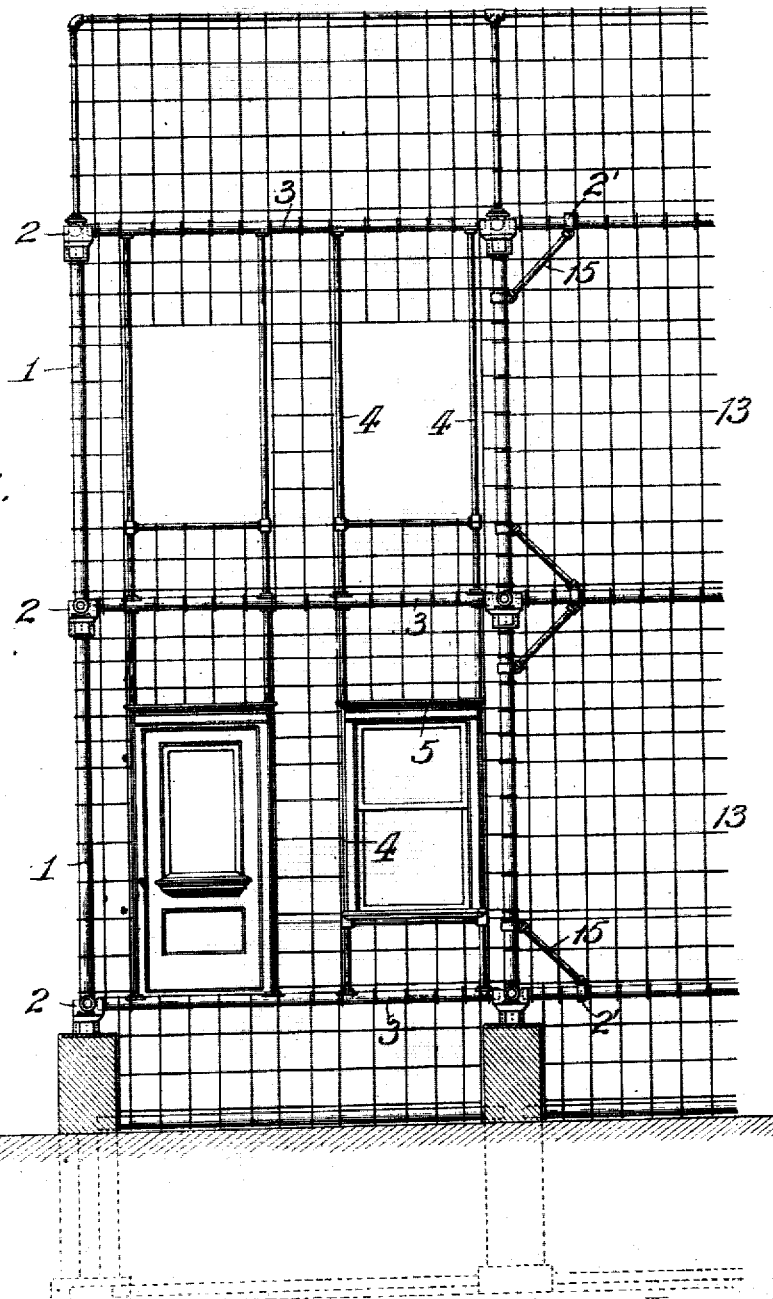
Figure 12:
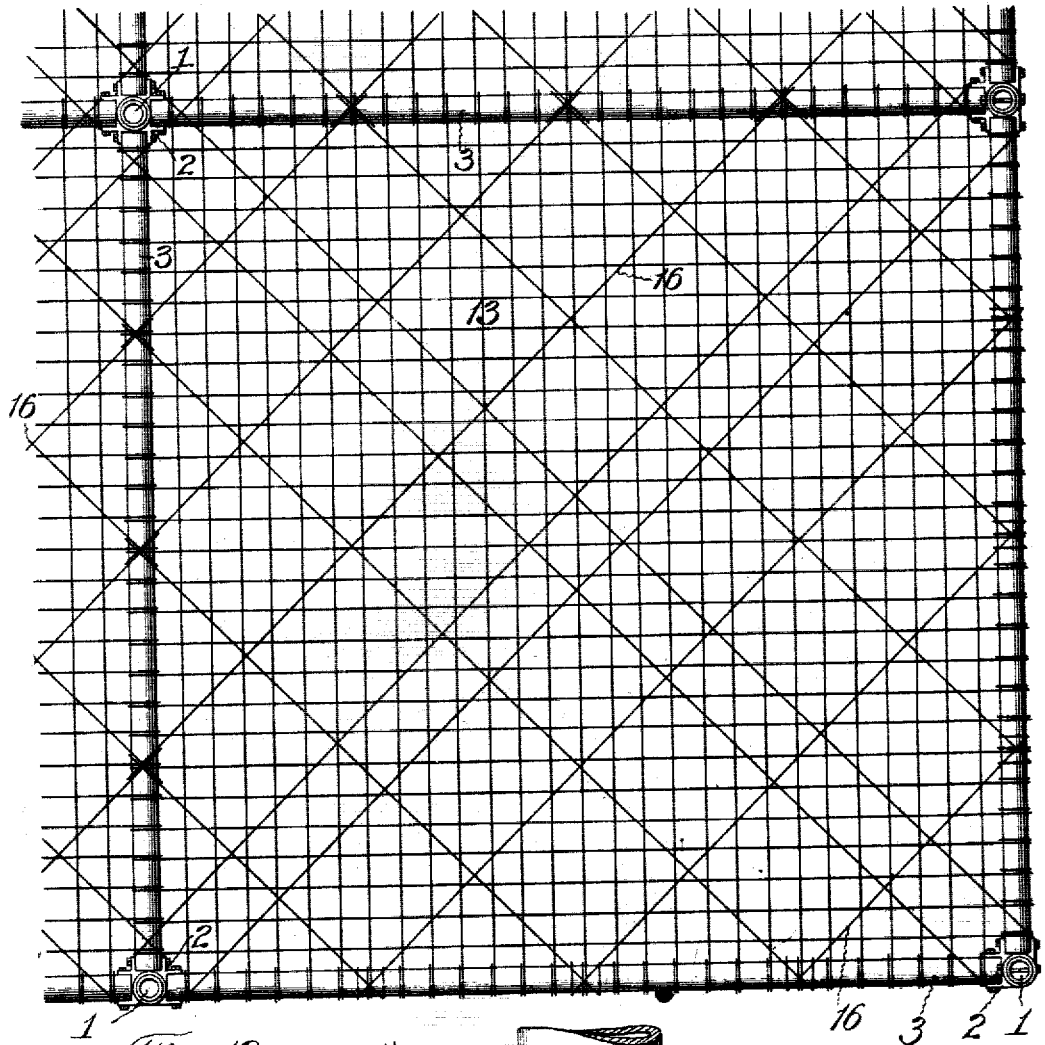
Figure 13:
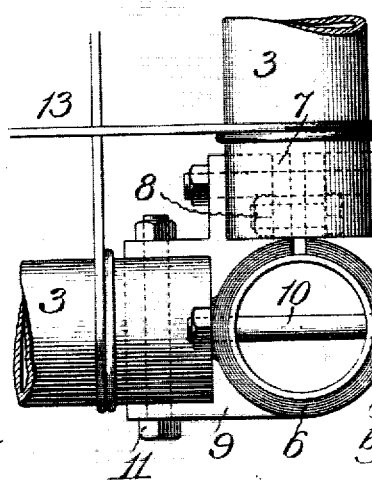

In the accompanying drawings:—Figure 1, is a general elevation illustrating the arrangement of the present tubular skeleton frame for the front of a building. Fig. 2, is a detail plan view of the present skeleton frame as arranged for the floor or other horizontal portion of a building. Fig. 3, is a detail side elevation of said frame as arranged for a wall, partition or like vertical portion of the building. Fig. 4, is an enlarged detail section on line *x—x* Fig. 2. Fig. 5, is an enlarged detail horizontal section on line *x'—x'* Fig. 6, illustrating the connection of a duplex arrangement of horizontal girders to a vertical corner post of the building. Fig. 6, is a detail side elevation of the same. Fig. 7, is a detail sectional plan of the flooring frame shown in Fig. 2, with the wire strands or web which forms a skeleton center for the frame, in place thereon. Fig. 8, is a detail plan view of a cross-fitting used in connecting up the present tubular skeleton frame. Fig. 9, is a detail side elevation of the same. Figs. 10 and 11, are diagram views in perspective, illustrating the manner of winding the wires upon the skeleton frame, to form a web or center upon one or upon the two opposite surfaces of the frame, to support the lathing as well as the unset mass of concrete used in the building operation. Fig. 12, is a view similar to Fig. 7 of a modified form of wire winding by which the frame center is formed. Fig. 13, is an enlarged detail plan view of one corner of the frame and winding shown in Fig. 12. Fig. 14, is a detail vertical section, illustrating a portion of the skeleton frame, wire center, and lathing, the parts being shown in their initial position prior to the imposition of the mass of concrete to form a floor or like horizontal part of the structure. Fig. 15, is a similar view showing the relative position of the parts with the mass of concrete in place, and illustrating that form of the present invention in which the floor etc, is of a solid concrete formation. Fig. 16 is a view similar to Fig. 15, illustrating that form of the present invention in which the floor etc, is of a hollow concrete construction. Figs. 17 and 18, are companion views to Figs. 15 and 16, and illustrative of a modified arrangement of parts.

Similar numerals of reference indicate like parts in the several views.

Referring to the drawings, 1 represents a series of tubular columns or posts, which in a building construction are supported on the usual foundation walls or sills, and of a height equal to that required in the building and which may consist of single lengths of wrought metal tubing or two or more sections of lesser lengths and secured together end to end by the fittings 2, as hereinafter described.

3, are a series of horizontal tubular girders or beams arranged in right angle relation with their meeting ends secured together and to an adjacent column or post 1, by a fitting 2, before referred to. Four of such girders secured together and supported as above described, with the accessories hereinafter described, constitutes the marginal frame for a single initial unit of the skeleton reinforce frame of a building or structure; additional units utilizing in their formation one of the girders of the unit to which unit an additional unit is connected, and as illustrated more particularly in Figs. 1, 2, 3, 7 and 12. Window, door and like openings are formed as required in said units by the provision of intermediate tubular posts or rails 4, and headers 5 as illustrated in Fig. 1.

The fittings 2, above referred to as connecting the columns 1, and girders 3, together, may be of any usual and suitable construction, the type of fittings illustrated in Figs. 4, 5, 6, 8, 9 and 13, are however preferred as affording a very convenient economical and substantial connection for coupling the parts together. Such preferred type of fittings constitute the subject matter of my companion application for Letters Patent Serial Number 349,683 filed of even date herewith, and are of the following construction in detail:—

6. is the main body of the fitting formed with a cylindrical bore of a diameter corresponding with the external diameter of the tubular column 1 or like member upon which the fitting is applied; and such main body is also formed with an opening along its length and with ears 7 at the margins of said opening for the passage of a clamping bolt 8 by which the diameter of the main body 6, is contracted to firmly and securely clamp such main body of the fitting upon the column or like member to which it is applied.

9 are one or more lateral branches integrally formed on the main body of the fitting, and in the required angular relation thereto, and depending upon whether an ell, tee, or cross-form of fitting is required. Such lateral branches are preferably of a stirrup or U shape, as shown, to admit of the ready introduction of the ends of the tubular girders 3, into place therein, and it is preferred that a branch of the aforesaid opening in the main body 1, be formed centrally in the semi-circular bottom wall of one or more of said lateral branches to afford an additional means for clamping and holding the end or ends of said girders in place.

10. are bolts passing transversely through the main body of the fitting and through orifices in the column 1, to additionally hold the parts in proper relative position.

11. are like bolts passing transversely through the side walls of the lateral branches 9, and through the ends of the girders for a like purpose to that above stated.

One part of the present invention consists in the provision in connection with a rectangular frame formed of sections of round tubing secured together by fittings as before set forth, of a skeleton wire centering or webbing 13, therefor, and which is formed by continuous wrappings of a single wire around said frame in spaced relation and in crossed or opposite directions, to afford an open web like center for the frame, and to which is attached in manner hereinafter described any usual and suitable form of sheet lathing to receive the mass of concrete which forms a floor or other portion of the structure. With the continuous wrapping above set forth, each individual strand thereof can be brought to a common and uniform tension, to bear in an even and uniform manner the normal, stress or load imposed on the frame as a whole, and thus afford very strong structure with a minimum amount of metal. In the preferred form of such wire center the different strands thereof are formed by winding wire of the proper length round and around the pairs of opposed parallel members comprising the skeleton frame aforesaid, and as illustrated in Figs. 4, 7, 16, 17 and 18, with the result that a wire web or center is provided on both surfaces of the skeleton frame; the circular form of said frame members permitting the wire strands to be tensioned to the proper degree in a ready and effective manner. The scope of this part of the present invention however involves the arrangement of a single wire center or web on one side or surface of the skeleton frame aforesaid, and with a view to meet the requirements for a thin floor, roof or like part of a building structure; and such construction is attained by the special manner of winding a number of skeleton frames at one time, as hereinafter described.
In the preferred form of the present invention the marginal frame of round tubing is connected together by fittings, and provided with tubular bracing members 15, arranged diagonally at the respective corners of said frame, and connected to the tubular frame members by angle fittings 2' preferably of the type heretofore described, and as set forth in detail in my companion application Serial No. 349,683; the parts so combined are adapted to effectually resist the great inward stress upon the frame members by the aforesaid wire center and the floor or other normal load imposed thereon.

Another part of the present invention consists in making the tubular diagonal brace members 15, aforesaid of a smaller diameter than the frame members aforesaid, and arranging said brace members in non central relation with the main frame members, as shown in Fig. 4, and with a view to prevent any interference of said braces with the dished form that is imposed on the wire center carried by the marginal frame aforesaid.

Another part of the present invention consists in the provision in connection with the tubular marginal frame and its wire web or center as heretofore described, of continuous diagonal windings 16, of wire adapted to embrace two or more of the frame units and tie together the various parts thereof in a manner to prevent an outward buckling of the frame members under the normal loads imposed thereon in actual use.

Another part of the present invention consists in the combination with a series of tubular skeleton frame units arranged in angular relation, of a system of winding the wire which forms the centers or webs of such series of skeleton units, and whereby such series of units are connected together in a strong and substantial manner. Such system of winding is illustrated diagram views, Figs. 10 and 11; the one figure illustrating a winding made in one direction, while the other figure illustrates a winding made in the reverse direction. In actual use either of said windings may be employed singly to form the aforesaid skeleton centers for the series of skeleton frame units, or they may be combined to afford very substantial horizontal centers, containing double the amount of wire strands contained in the vertical centers of a structure so formed, or vice versa. The course of a single winding of wire to encompass two horizontal series of units and one vertical unit, is shown in said diagrams, with arrows to indicate the circuitous route taken by the wire winding from and back to a common starting point, with the directions in which the loops around the horizontal members of the structure are made. In detail, the wire starting from a point 13ª loops around an upper horizontal tubular member 3ª; thence downwardly to loop around a lower horizontal tubular member 3ᵇ; thence horizontally with a loop embracing the intermediate lower horizontal tubular member 3ᶜ and horizontally to and halfway around another lower horizontal tubular member 3ᵈ; the wire then returns horizontally to and around the aforesaid intermediate horizontal member 3ᶜ, and horizontally to and around the aforesaid horizontal member 3ᵇ; thence vertically to and around the aforesaid horizontal member 3ᵃ; thence horizontally with a loop embracing the intermediate upper horizontal member 3ᵉ, and horizontally to and halfway around another upper horizontal member 3ᶠ; the wire then returns horizontally to and around the intermediate horizontal member 3ᵉ, and horizontally to and around the aforesaid horizontal member 3ª to the starting point 13ª above described, for a fresh cycle of the winding operations thus described and until the entire surfaces of the sections or units are covered with the continuous wrapping of wire.

In one form of the present construction the skeleton marginal frame will comprise pairs of tubular sections 17 and 18 arranged side by side in a horizontal plane to constitute the horizontal girders of such skeleton frame. Such tubular sections are carried by single multiple fittings 2″ at the adjoining ends thereof, as illustrated in Fig. 5; such arrangement affords a very strong and compact construction for withstanding the stress imposed upon the floors of many classes of buildings. Where still greater strength is desired, a third tubular section 19, is arranged at the side of the aforesaid tubular sections and in a vertical plane therewith, as illustrated in Fig. 6; and in such case, said tubular section 19 will be connected at each end to a vertical column, or post 1, by an individual fitting 2, of the form heretofore described.

The multiple fitting 2″ above referred to constitutes a portion of the subject matter of my companion application Serial Number 349,683 filed of even date herewith, and no claim to such fitting is made in the present application.

20 and 21, are sheets of perforated lathing of metal or other material, and perforated or reticulated in any usual and suitable manner; such lathing sheets are supported a distance away from the centers or webs 13 of the skeleton frames before described, by any usual means, as for instance: the series of short suspension links 22, shown in Figs. 14 and 15, where a floor or like horizontal part of a building is to be formed of solid concrete and of a limited thickness; or the series of short and long suspension links 22 and 23, shown in Fig. 16, whereby upper and lower lathing sheets 20 and 21 are employed to form a floor or the like, of an extended thickness and having a hollow interior forming a dead air space for the prevention of the passage of sound, etc at the series of staples 25 and intermediate strips of wood 26 into which said staples are driven as illustrated in Figs. 17 and 18.

The heretofore referred to hollow interior of the floor or other like building portion, is adapted to contain a filling of baled straw or like fibrous non-conducting material, and which filling can be utilized to hold the duplicate sheets of lathing 20 and 21, in proper separated relation.

In the present construction the before described wire web or center of the skeleton frame will have a dished form, the curve of which approximates a catenary, and around which the mass of concrete which forms a floor or like horizontal portion of a building, is applied with its upper surface horizontal, as illustrated in Figs. 15, 16, and 18. In such construction the perforated lathing 20, will have a horizontal position in the finished floor, etc, and to such end will have an initially upward dished form, and secured in such dished form to the wire web or center 13, while the same is in its initially flat condition as first formed, and as illustrated in Figs. 14 and 17. Prior to the application of the mass of concrete the web or center 13, is drawn down into the required dish shape by stress exerted thereon in any usual manner, and in such operation the upward disk is removed from the lathing sheet 20, and the same brought to the flat condition illustrated in Figs. 15, 16, and 18.

Having thus fully described my said invention what I claim as new and desire to secure by Letters Patent is:—

1. In a building, a rectangular marginal frame formed of round tubing, a continuous wrapping of wire wound around the circular periphery of the tubing to form a skeleton center and formed of a single length of wire, and a mass of concrete inclosing said frame and center.

2. In a building a rectangular marginal frame formed of round tubing, continuous wrappings of wire wound around the circular periphery of the tubing in right-angle relation to form a skeleton center and formed of a single length of wire, and a mass of concrete inclosing said frame and center.

3. In a building, a rectangular marginal frame formed of round tubing, a continuous wrapping of wire wound around the circular periphery of the tubing to form a skeleton center, and formed of a single length of wire, a mass of concrete inclosing said frame and center, the center having a dished form in the concrete mass.

4. In a building, a rectangular marginal frame formed of round tubing, a continuous wrapping of wire wound around the circular periphery of the tubing to form a skeleton center and formed of a single length of wire, a supplementary diagonal winding of wire on said marginal frame and forming a portion of the center, and a mass of concrete inclosing said frame and center.

5. In a building, a rectangular marginal frame formed of round tubing, continuous wrappings of wire wound around the circular periphery of the tubing in right-angle relation to form a skeleton center and formed of a single length of wire, a supplementary diagonal winding of wire on said marginal frame and forming a portion of said center and a mass of concrete inclosing said frame and center.

6. In a building, a rectangular marginal frame formed of round tubing, a continuous wrapping of wire wound around the circular periphery of the tubing to form a skeleton center and formed of a single length of wire, supplementary diagonal windings of wire in right angle relation on said marginal frame and forming a portion of the center, and a mass of concrete inclosing said frame and center.

7. In a building, a rectangular marginal frame formed of round tubing, continuous wrappings of wire wound around the circular periphery of the tubing in right-angle relation to form a skeleton center and formed of a single length of wire, supplementary diagonal windings of wire in right angle relation on said marginal frame and forming a portion of the center, and a mass of concrete inclosing said frame and center.

8. In a building, a rectangular marginal frame formed of round tubing and provided with diagonal braces of round tubing at its corners, a continuous wrapping of wire wound around the circular periphery of the frame tubing to form a skeleton center and formed of a single length of wire, and a mass of concrete inclosing said frame and center.

9. In a building, a rectangular marginal frame formed of round tubing and provided with diagonal braces of round tubing at its corners, continuous wrappings of wire wound around the circular periphery of the frame tubing in right angle relation to form a skeleton center and formed of a single length of wire, and a mass of concrete inclosing said frame and center.

10. In a building, a rectangular marginal frame formed of round tubing and provided with diagonal braces of round tubing at its corners, a continuous wrapping of wire wound around the circular periphery of the frame tubing to form a skeleton center and formed of a single length of wire, and a mass of concrete inclosing said frame and center, the center having a dished form in the mass of concrete.

11. In a building, a rectangular marginal frame formed of round tubing and provided with diagonal braces of round tubing at its corners, a continuous wrapping of wire wound around the circular periphery of the frame tubing to form a skeleton center and formed of a single length of wire, a supplementary diagonal winding of wire on said marginal frame and forming a portion of the center, and a mass of concrete inclosing said frame and center.

12. In a building, a rectangular marginal frame formed of round tubing and provided with diagonal braces of round tubing at its corners, continuous wrappings of wire wound around the circular periphery of the frame tubing in right angle relation to form a skeleton center and formed of a single length of wire, supplementary diagonal windings of wire in right angle relation on said marginal frame and forming a portion of the center, and a mass of concrete inclosing said frame and center.

13. In a building, a rectangular marginal frame formed of round tubing and provided with diagonal braces of round tubing at its corners, said braces having a smaller diameter than the frame tubing and arranged in non-central relation thereto, a continuous wrapping of wire wound around the circular periphery of the frame tubing to form a skeleton center and formed of a single length of wire, and a mass of concrete inclosing said frame and center.

14. In a building, a rectangular marginal frame formed of round tubing and provided with diagonal braces of round tubing at its corners, said braces having a smaller diameter than the frame tubing and arranged in non-central relation thereto, continuous wrappings of wire wound around the circular periphery of the frame tubing in right-angle relation to form a skeleton center, and formed of a single length of wire, and a mass of concrete inclosing said frame and center.

15. In a building, a rectangular marginal frame formed of round tubing and provided with diagonal braces of round tubing at its corners, said braces having a smaller diameter than the frame tubing and arranged in non-central relation thereto, a wrapping of wire wound on said frame to form a skeleton center and formed of a single length of wire, and a mass of concrete inclosing said frame and center, the center having a dished form in the mass of concrete.

16. In a building, a rectangular marginal frame formed of round tubing, a skeleton center therefor formed by a continuous wrapping of wire around the circular periphery of the frame tubing, and formed of a single length of wire perforated lathing carried by said center, and a mass of concrete inclosing said frame and center.

17. In a building, a rectangular marginal frame formed of round tubing, a skeleton center therefor formed by continuous wrappings of wire around the circular periphery of the frame tubing in right angle relation and formed of a single length of wire, perforated lathing carried by said center, and a mass of concrete inclosing said frame and center.

18. In a building, a rectangular marginal frame formed of round tubing, a skeleton center therefor formed by a continuous wrapping of wire around the circular periphery of the frame tubing, and formed of a single length of wire perforated lathing carried by said center, and a mass of concrete inclosing said frame and center, the center having a dished form in the concrete mass.

19. In a building, a rectangular marginal frame formed of round tubing, a skeleton center therefor formed by a continuous wrapping of wire around the circular periphery of the frame tubing, and formed of a single length of wire perforated lathing carried by said center, and a mass of concrete inclosing said frame and center, the center having a dished form in the concrete mass, and the lathing a parallel relation to one surface of the concrete mass.

20. In a building, a rectangular marginal frame formed of round tubing and provided with diagonal braces of round tubing at its corners, a skeleton center therefor formed by a continuous wrapping of wire around the circular periphery of the frame tubing, and formed of a single length of wire perforated lathing carried by said center, and a mass of concrete inclosing said frame and center.

21. In a building, a rectangular marginal frame formed of round tubing and provided with diagonal braces of round tubing at its corners, a skeleton center therefor formed by continuous wrappings of wire around the circular periphery of the frame tubing in right angle relation and formed of a single length of wire, perforated lathing carried by said center, and a mass of concrete inclosing said frame and center.

22. In a building, a rectangular marginal frame formed of round tubing and provided with diagonal braces of round tubing at its corners, a skeleton center therefor formed by a continuous wrapping of wire around the circular periphery of the frame tubing, and formed of a single length of wire perforated lathing carried by said center, and a mass of concrete inclosing said frame and center, the center having a dished form in the mass of concrete.

23. In a building, a rectangular marginal frame formed of round tubing and provided with diagonal braces of round tubing at its corners, a skeleton center therefor formed by a continuous wrapping of wire around the circular periphery of the frame tubing, and formed of a single length of wire perforated lathing carried by said center, and a mass of concrete inclosing said frame and center, the center having a dished form in the mass of concrete, and the lathing a parallel relation to one surface of the concrete mass.

24. In a building, a rectangular marginal frame formed by round tubing and provided with diagonal braces of round tubing at its corners, said braces having a smaller diameter than the frame tubing and arranged in non-central relation thereto, a skeleton center therefor formed by a continuous wrapping of wire around the circular periphery of the frame tubing, and formed of a single length of wire perforated lathing carried by said center, and a mass of concrete inclosing said frame and center.

25. In a building, a rectangular marginal frame formed by round tubing and provided with diagonal braces of round tubing at its corners, said braces having a smaller diameter than the frame tubing and arranged in non-central relation thereto, a skeleton center therefor formed by continuous wrappings of wire wound upon said circular periphery of the frame tubing in right-angle relation, and formed of a single length of wire perforated lathing carried by said center, and a mass of concrete inclosing said frame and center.

26. In a building, a rectangular marginal frame formed by round tubing and provided with diagonal braces of round tubing at its corners, said braces having a smaller diameter than the frame tubing and arranged in non-central relation thereto, a skeleton center therefor formed by a continuous wrapping of wire around the circular periphery of the frame tubing, and formed of a single length of wire perforated lathing carried by said center, and a mass of concrete inclosing said frame and center, the center having a dished form in the mass of concrete.

27. In a building, a rectangular marginal frame formed by round tubing and provided with diagonal braces of round tubing at its corners, said braces having a smaller diameter than the frame tubing and arranged in non-central relation thereto, a skeleton center therefor formed by a continuous wrapping of wire around the circular periphery of the frame tubing, and formed of a single length of wire perforated lathing carried by said center, and a mass of concrete inclosing said frame and center, the center having a dished form in the concrete mass, and the lathing a parallel relation to one surface of the concrete mass.

28. In a building, a rectangular marginal frame formed by round tubing and provided with diagonal braces of round tubing at its corners, said braces having a smaller diameter than the frame tubing and arranged in non-central relation thereto, a skeleton center therefor formed by a continuous wrapping of wire around the circular periphery of the frame tubing, and formed of a single length of wire perforated lathing carried by said center, short and long supporting links forming the connection between the lathing and center to impose a dished form upon one of the parts in relation to the other, and a mass of concrete inclosing the frame and center.

29. In a building, a series of rectangular marginal frames formed of round tubing and arranged in angular relation to each other, a continuous wrapping of wire encompassing the series of frames and forming skeleton centers therefor and formed of a single length of wire, and a mass of concrete inclosing the frames and centers.

30. In a building, a series of rectangular marginal frames formed of round tubing and arranged in angular relation to each other, a continuous wrapping of wire encompassing the series of frames and forming skeleton centers therefor and formed of a single length of wire, perforated lathing carried by said centers, and a mass of concrete inclosing the frames and centers.

31. In a building, a series of rectangular marginal frames formed of round tubing and arranged in angular relation to each other, a continuous wrapping of wire encompassing the series of frames and forming skeleton centers therefor and formed of a single length of wire, a supplemental winding of wire around each frame in right angle relation to the continuous winding aforesaid and forming part of the frame center, and a mass of concrete inclosing the frames and centers.

32. In a building, a series of rectangular marginal frames formed of round tubing and arranged in angular relation to each other, a continuous wrapping of wire encompassing the series of frames and forming skeleton centers therefor and formed of a single length of wire, perforated lathing carried by said centers, and a mass of concrete inclosing the frames and centers, the centers having a dished form in the concrete mass.

33. In a building, a series of rectangular marginal frames formed of round tubing and arranged in angular relation to each other, a continuous wrapping of wire encompassing the series of frames and forming skeleton centers therefor and formed of a single length of wire, perforated lathing carried by said centers, and a mass of concrete inclosing the frames and centers, the centers having a dished form in the concrete mass and the lathing a parallel relation to one surface of such concrete mass.

34. In a building, a series of rectangular marginal frames formed of round tubing and arranged in angular relation to each other, a continuous wrapping of wire encompassing the series of frames and forming skeleton centers therefor and formed of a single length of wire, perforated lathing carried by said centers, short links forming the connections between the lathing and the centers, and a mass of concrete inclosing the frames and centers.

35. In a building, a series of rectangular marginal frames formed of round tubing and arranged in angular relation to each other a continuous wrapping of wire encompassing the series of frames and forming skeleton centers therefor and formed of a single length of wire, perforated lathing carried by said centers, a supplemental diagonal winding of wire around each marginal frame and forming a portion of the center thereof, and a mass of concrete inclosing the frames and centers.

36. In a building, a series of rectangular marginal frames formed of round tubing and arranged in angular relation to each other, a continuous wrapping of wire encompassing the series of frames and forming skeleton centers therefor and formed of a single length of wire, perforated lathing carried by said centers, supplemental diagonal windings of wire in right angle relation around each marginal frame and forming a portion of the center thereof, and a mass of concrete inclosing the frames and centers.

37. In a building, a series of rectangular marginal frames formed of round tubing and arranged in angular relation to each other, two continuous wrappings of wires extending in opposite directions and encompassing the series of frames to form skeleton centers therefor, each of said wrappings comprising a single length of wire, and a mass of concrete inclosing the frames and centers.

38. In a building, a series of rectangular marginal frames formed of round tubing and arranged in angular relation to each other, two continuous wrappings of wires extending in opposite directions and encompassing the series of frames to form skeleton centers therefor, each of said wrappings comprising a single length of wire, perforated lathing carried by said centers, and a mass of concrete inclosing the frames and centers.

39. In a building, a series of rectangular marginal frames formed of round tubing and arranged in angular relation to each other, two continuous wrappings of wires extending in opposite directions and encompassing the series of frames to form skeleton centers therefor, each of said wrappings comprising a single length of wire, a supplementary winding of wire around each frame in right angle relation to said continuous windings and forming part of the frame center, and a mass of concrete inclosing the frames and centers.

40. In a building, a series of rectangular marginal frames formed of round tubing and arranged in angular relation to each other, two continuous wrappings of wires extending in opposite directions and encompassing the series of frames to form skeleton centers therefor each of said wrappings comprising a single length of wire, perforated lathing carried by said centers, and a mass of concrete inclosing the frames and centers, said centers having a dished form in the concrete mass.

41. In a building, a series of rectangular marginal frames formed of round tubing and arranged in angular relation to each other, two continuous wrappings of wires extending in opposite directions and encompassing the series of frames to form skeleton centers therefor each of said wrappings comprising a single length of wire, perforated lathing carried by said centers, and a mass of concrete inclosing the frames and centers, said centers having a dished form in the concrete mass and the lathing a parallel relation to one surface of such concrete mass.

42. In a building, a series of rectangular marginal frames formed of round tubing and arranged in angular relation to each other, two continuous wrappings of wires extending in opposite directions and encompassing the series of frames to form skeleton centers therefor each of said wrappings comprising a single length of wire, perforated lathing carried by said centers, short links forming the connections between the lathing and the centers, and a mass of concrete inclosing the frames and centers.

43. In a building, a series of rectangular marginal frames formed of round tubing and arranged in angular relation to each other, two continuous wrappings of wires extending in opposite directions and encompassing the series of frames to form skeleton centers therefor each of said wrappings comprising a single length of wire, perforated lathing carried by said centers, a supplemental diagonal winding of wire around each marginal frame and forming a portion of the center thereof, and a mass of concrete inclosing the frames and centers.

44. In a building, a series of rectangular marginal frames formed of round tubing and arranged in angular relation to each other, two continuous wrappings of wires extending in opposite directions and encompassing the series of frames to form skeleton centers therefor each of said wrappings comprising a single length of wire, perforated lathing carried by said centers, supplemental diagonal windings of wire in right angle relation on each marginal frame and forming a portion of the center thereof, and a mass of concrete inclosing the frames and centers.

45. In a building, a rectangular marginal frame formed of duplicate sections of round tubing arranged in parallel and adjacent relation, a wrapping of wire wound around the circular periphery of the tubing to form a skeleton center and formed of a single length of wire, and a mass of concrete inclosing said frame and center.

46. In a building, a rectangular marginal frame formed of duplicate sections of round tubing arranged in parallel and adjacent relation, wrappings of wire wound around the circular periphery of the tubing in right angle relation to form a skeleton center and formed of a single length of wire, and a mass of concrete inclosing said frame and center.

47. In a building, a rectangular marginal frame formed of duplicate sections of round tubing arranged in parallel and adjacent relation, a wrapping of wire wound around the circular periphery of the tubing to form a skeleton center and formed of a single length of wire, and a mass of concrete inclosing said frame and center, said center having a dished form in the concrete mass.

48. In a building, a rectangular marginal frame formed of duplicate sections of round tubing arranged in adjacent horizontal relation, a wrapping of wire wound around the circular periphery of the tubing to form a skeleton center and formed of a single length of wire, and a mass of concrete inclosing said frame and center.

49. In a building, a rectangular marginal frame formed of duplicate sections of round tubing arranged in adjacent horizontal relation, wrappings of wire wound around the circular periphery of the tubing in right angle relation to form a skeleton center and formed of a single length of wire, and a mass of concrete inclosing said frame and center.

50. In a building, a rectangular marginal frame formed of duplicate sections of round tubing arranged in adjacent horizontal relation, a wrapping of wire wound around the circular periphery of the tubing to form a skeleton center and formed of a single length of wire, and a mass of concrete inclosing said frame and center, said center having a dished form in the concrete mass.

51. In a building, a rectangular marginal frame formed of duplicate sections of round tubing arranged in adjacent vertical and horizontal relations, a wrapping of wire wound around the circular periphery of the tubing to form a skeleton center and formed of a single length of wire, and a mass of concrete inclosing said frame and center.

52. In a building, a rectangular marginal frame formed of duplicate sections of round tubing arranged in adjacent vertical and horizontal relations, wrappings of wire wound around the circular periphery of the tubing in right-angle relation to form a skeleton center and formed of a single length of wire, and a mass of concrete inclosing said frame and center.

53. In a building, a rectangular marginal frame formed of duplicate sections of round tubing arranged in adjacent vertical and horizontal relations, a wrapping of wire wound around the circular periphery of the tubing to form a skeleton center and formed of a single length of wire, and a mass of concrete inclosing said frame and center, said center having a dished form in the concrete mass.

Signed at Chicago, Illinois, this 19th day of December 1906.

GEORGE M. GRAHAM.

Witnesses:
ROBERT BURNS.
HENRY MOE.